Sept 17, 1957 V. SOPER 2,806,965
ELECTRIC FENCE CONTROLLER
Filed Dec. 1, 1953

INVENTOR
Vernard Soper
BY: Whiteley & Caine
ATTORNEYS ated Sept. 17, 1957

2,806,965

ELECTRIC FENCE CONTROLLER

Vernard Soper, Minneapolis, Minn.

Application December 1, 1953, Serial No. 395,366

2 Claims. (Cl. 307—132)

This invention pertains to an electric fence controller which is used to control the supply of electric current to one or more wires forming a fence. In general it is concerned with a mechanically operated switching mechanism for intermittently supplying the current to the fence for short predetermined periods of time. In particular the invention is concerned with a switching mechanism including a mercury switch which is constructed to close a circuit only when moved, together with a linkage which provides a certain amount of lost motion so that the current is of sufficient duration to saturate the fence but short enough to prevent injury to persons or animals coming into contact with the fence.

It is customary to use fenced areas to enclose grazing livestock, but as the animals are likely to break the fence, it has become a practice to electrify the fence with a current sufficient to shock the animals and thereby discourage contact with the fence. Because the animals soon learn to avoid contact with an electrified fence, grass and weeds will grow extensively in the area adjacent the fence, and on coming in contact with the electrified wires cause a short circuit to the ground, thereby destroying the effect of electrification. As a result, it has been found that if current is passed through a step-up transformer to materially increase its voltage, the higher voltage current will readily destroy any contacting vegetation. Because a high voltage current could be very dangerous and might likely kill animals or persons who come in contact with the fence, it has been found essential to provide intermittent current of relatively short duration.

It has been generally accepted that where high voltage current is used intermittently for this purpose, that if the duration of the current is not substantially in excess of about one-tenth of a second, this will not cause permanent injury to animals, but nevertheless is of sufficient duration to destroy grass and weeds that come into contact with the fence. In the past, the flow of current to the conducting fence has been regulated by a form of thermal interrupter or other electrical circuit arrangements which periodically closes the switch and thereafter opens the same in response to heat created by current passing through a suitable resistance associated with the switch in the interrupter. By this arrangement current of sufficient duration could be provided to kill weeds which come into contact with the electrified fence. The difficulty with all prior arrangements has been in providing uniformity of calibration and a "fail safe" arrangement so as to be able to assure the user thereof that current will not remain "on" for more than a predetermined length of time. It will be readily apparent that failure of a switch to "open" when carrying a high voltage current might be fatal or at least highly injurious to animals or persons that might come into contact with the fence.

To obviate the difficulty in properly timing the duration in which current is supplied to the fence and assure a safe condition on failure of any part, I have found that in place of prior art arrangements, a switch which will always fail safe and in general operate to close a circuit on movement between two positions, will provide a more satisfactory means of supplying current of extremely short duration. Furthermore, I have found that if such a switch can be mechanically operated by a suitable arrangement including a constant speed motor and a "lost motion" connection, that the timing of the movement of the switch may be accurately controlled to give a predetermined number of closings per unit of time.

As an exemplification of such an arrangement, I have found that if a tubular mercury switch is slightly curved at its center and provided with centrally disposed electrodes, that when such a switch is tilted from end to end, as the mercury passes through the curved center portion, it will simultaneously engage both of the electrodes to complete a circuit from a suitable source of power to the fence wire and will always "fail safe." The problem therefore is to arrange for the proper periodic tilting of the switch. If the switch is tilted too rapidly, the current supplied to the fence is not of sufficient duration to saturate the fence, whereas if it is tilted too slowly the mercury globule may remain in contact with the electrodes long enough to cause permanent injury to any animal or person coming into contact with the fence. The problem may be overcome by mounting a switch, such as a mercury switch, on a suitable support which is journalled for rotative movement, and by the use of a "lost motion" connection with a synchronous motor the proper timing can be obtained. In the present disclosure the "lost motion" is provided by an eccentric cam, connected to the motor, and which rotates within a vertical slot formed in the supporting member that carries the switch. The slot is of predetermined dimension with respect to portions of the cam and therefore is just large enough to permit lateral tilting of the support, and since the speed of rotation of the cam is a known factor it is possible to accurately compute the period of time when the mercury globule is in contact with the electrodes, thus assuring an accurate timing of the current impulses to the fence.

The principal object of the invention is to provide in an electric fence controller, a "fail safe" switching mechanism which is capable of accurately timing the flow of intermittent current to a conducting fence.

Another object is to provide in an electric fence controller a mechanically operated switch which provides intermittent closing of a circuit for a duration of substantially one-tenth of a second.

Another object is to provide in a controller for intermittently electrifying a conducting fence, including a tiltable mercury switch having electrodes disposed for momentary closure by the movement of a mercury globule, together with a motor and a lost motion connection for tilting the switch at a rate sufficient to assume saturation of the fence at predetermined intervals.

A further object is to provide in a controller for intermittently electrifying a conducting fence, a curved mercury switch having centrally disposed electrodes which are momentarily closed by the passage of a mercury globule, supported for end to end tilting movement by a supporting member that contains an elongated slot, together with a motor driven eccentric cam positioned within the slot to give slow tilting movement to the support and the mercury switch carried thereby.

Other and further objects may become apparent from the following specification and claims, and in the appended drawings in which:

Figure 1:
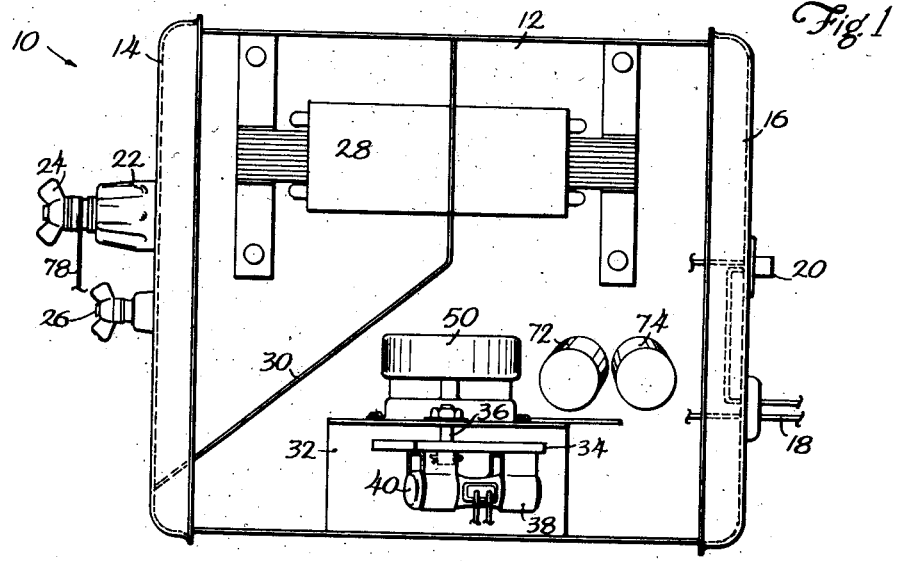
Fig. 1 is a plan view of a fence controller with certain portions of the casing removed to show interior structure.

Referring now to the several figures of the drawings, the invention will be explained in detail. Referring first to Fig. 1, general reference numeral 10 indicates a fence controller composed of a casing in which the floor plate is indicated by reference character 12 and a pair of oppositely disposed end plates are indicated at 14 and 16. There has been omitted from the showing a central U-shaped cover which extends between the end plates 14 and 16, and at its opposite ends joins the floor plate 12. Shown as being carried by the end plate 16 is a fragmentary portion of an extension cord indicated at 18, and a manual switch 20. The end plate 14 carries a heavy insulator 22 which supports a power connection 24, and adjacent the power connection 24 and also carried by end plate 14 is a ground connection 26. Within the interior of the casing is a step-up transformer 28 which is connected between the source of power and the outlet connection 24 for producing high voltage current which is transmitted by the connection 24 to a fence wire indicated at 78. A shield 30 extends across the transformer 28 and merely forms a guard for certain other elements of the structure.

Figure 2:
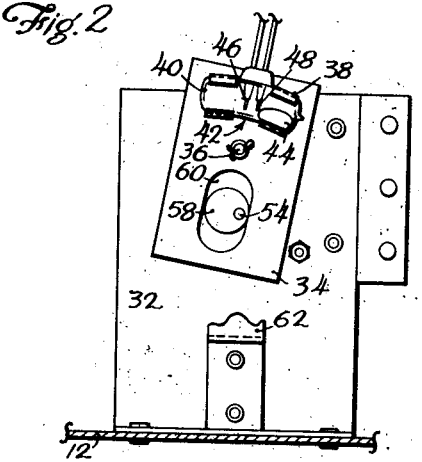
Fig. 2 is an elevation of a portion of the structure shown in the lower part of Fig. 1.
Figure 3:
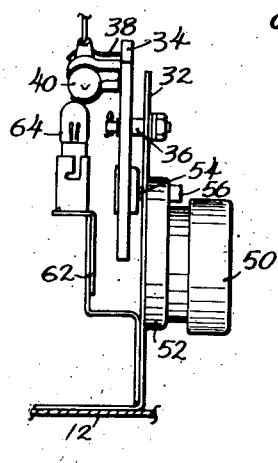
Fig. 3 is a side view of the structure shown in Fig. 2.

Referring now to Figs. 2 and 3, reference character 32 indicates a bracket which is secured on the floor plate 12 of the casing. On the front side of bracket 32 is a supporting member 34 which is supported for pivotal movement by a journalled staff 36. A suitable bracket 38 carried by the supporting member 34 holds a mercury switch indicated at 40. The switch 40 is of elongated configuration and is slightly curved between its ends to provide opposite legs which have a dead center indicated at 42. The switch 40 contains a globule of mercury 44, and it also contains two electrodes indicated at 46, 48 which extend into the path of movement of the mercury as it travels from one end to the other of the switch 40.

Situated on the rear side of bracket 32 is a synchronous electric clock motor 50, which through a reduction gear 52, drives a shaft 54 which is supported on its rear end in a bearing 56. On its front end, shaft 54 is eccentrically connected to a cam 58 which fits into an enlarged vertical slot 60 in the supporting member 34.

Cam 58 and slot 60 formed in the supporting member 34 are intended to provide a form of "lost motion" between motor 50 and the switch 44, and therefore the dimensions of slot 60 and its relationship with cam 58 are important. The width of the slot is just sufficient to give clearance to the cam 58, because the latter must freely rotate in the slot. The length of slot 60 is twice the distance between the axis of shaft 54 to the most distant point of the cam from shaft 54. This arrangement between the slot and the cam gives rocking movement to the support 34 on its staff 36. Thus one complete rotation of the cam causes the switch to be tipped once in each direction so that the mercury globule engages the electrodes 46 and 48 twice with each rotation of the cam, but because of the surface tension of the mercury globule it tends to adhere to each end of the tube until the tube has been tipped to an angle sufficient for the entire body of mercury to flow through the curved dead center point 42.

As best seen in Fig. 3, on the front end of the bracket 32 is a second bracket 62 which holds a small incandescent lamp 64 directly beneath the mercury switch 40. The lamp, as will be explained hereinafter, is connected in circuit with other features of the invention to give visual indication of the closing of a circuit by virtue of the fact that the mercury is then in contact with electrodes 46, 48.

Figure 4:
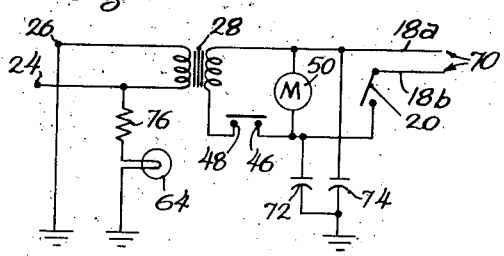
Fig. 4 is a schematic wiring diagram of the elements shown in Fig. 1.

Referring now to Fig. 4, is a schematic diagram of the wiring arrangement of the several parts shown in Fig. 1.

A source of power is indicated at 70, and the conductors 18a and 18b schematically illustrate the extension cord with conductor 18b extending to the manual switch 20 and from thence connected to the electrodes 46, 48 on the primary side of the transformer 28. Conductor 18a extends to the other side of the primary coil of the transformer. To reduce radio interference, a pair of condensers 72, 74 are connected into the circuit on one side and on their opposite poles to ground. The secondary side of the transformer, which in this case is a step-up transformer, is alternately connected to the high voltage connection 24 and the ground connection 26. A resistor 76 is connected in series with the high voltage connection 24 and serves merely to reduce the current which flows to the incandescent bulb 64.

Referring now to the several figures of the invention, the operation of the device will be explained. A heavy fence wire indicated in Fig. 1 at 78 is suitably coupled to the power connection 24 and the conductors 18a, 18b are connected to a source of conventional low voltage commercial current. When the switch 20 is closed, motor 50 is energized and commences the slow rotation of the driven shaft 54. The cam 58 being of an eccentric nature as to its connection with the shaft 54, slowly rotates in the slot 60, moving from end to end therein, causing the supporting member 34 to tilt laterally on its support 36, thereby tilting the mercury switch 40 in opposite lateral directions to cause the mercury globule 48 to move from end to end in the switch. As the globule 48 moves over to the dead center position 42 of the switch 40, it comes into contact with the two electrodes 46, 48, thereby completing a circuit to the primary coil of the transformer 28, which causes a high voltage potential to be formed in the secondary coil of transformer 28 which is conducted to the electrode 24 and fence wire 78 and simultaneously through the resistance 76 to the incandescent bulb 64. The time required for the mercury to be in contact with both of the electrodes 46, 48 will be a definite period of time necessary for the mercury globule to flow over the dead center position 42, and because of the high surface tension the mercury always remains as a single globule. Because the mercury cannot remain in the dead center position in engagement with electrodes 46, 48, the switch will always "fail safe" if any mechanical or circuit failure should occur. Moreover, the "on" period of the switch is long enough to assure an ample shock but without the possibility of having a continuous shocking current passing through the fence.

The advantage of the present invention is in the provision of a positive acting mechanical switch which is mechanically moved between two non-conducting positions in such a manner that it is in conducting relationship for approximately one-tenth of a second, and in the event of failure of any of the parts, will always fail safe since it will be readily recognized that the mercury cannot be retained in a dead center position of the curved tube. Therefore, the high voltage current to the fence wire 78 is of short intermittent duration and will not cause permanent injury to persons or animals who come into contact with the fence.

Another advantage resides in the simple lost motion connection between a continuously operated motor and a switch by means of a cam and an elongated slot in a supporting member, to provide a simple means of slowly moving a mercury switch in regular timed sequence.

My invention is defined in the terms of the appended claims.

I claim:

1. In combination with a conductive fence wire and a source of commercial current, means for intermittently impressing a high voltage current on said fence wire comprising a step-up transformer including a secondary coil having a grounded connection to the fence wire and a primary coil, a curved tubular switch body, a pair of electrodes connected respectively to the source of current and the primary transformer coil and extending in sideby-side relationship into the center of said switch body, a mercury globule in said body, a pivotally mounted member supporting said switch, a synchronous motor, and an eccentric cam driven by said motor and operably connected to said supporting member to oscillate said switch, moving said globule into contact with said electrodes at regular predetermined short periods of time, and maintaining said globule at the opposite ends of said switch body for regular predetermined long periods of time.

2. In combination with a conductive fence wire and a source of commercial current, means for intermittently impressing a high voltage current on said fence wire comprising a step-up transformer including a secondary coil having a grounded connection to the fence wire and a primary coil, a curved tubular switch body formed with the outer ends curved downwardly from the center portion thereof, a pair of electrodes connected respectively to the source of current and the primary transformer coil and depending in side-by-side relationship into the center of said switch body, a mercury globule in said body, a pivotally mounted supporting member, said switch supported on said member on one side of the axis of rotation thereof, said member formed with an elongated vertical slot disposed on the side of the axis opposite said switch, a synchronous motor, and an eccentric cam driven by said motor and extending into said slot and effective on rotation therein to oscillate said member in opposite directions, moving said globule into contact with said electrodes for a period of substantially one-tenth of a second and maintaining said globule at the opposite ends of said switch body for substantially greater predetermined intervals of time.

References Cited in the file of this patent

UNITED STATES PATENTS

| 965,754 | Schantz | July 26, 1910 |
| 1,701,398 | Vickery | Feb. 5, 1929 |
| 1,974,960 | Hotchkiss | Sept. 25, 1934 |
| 2,622,136 | Christensen | Dec. 16, 1952 |

FOREIGN PATENTS

| 347,507 | Great Britain | Apr. 30, 1931 |